United States Patent [19]

Ishizuka

[11] Patent Number: 5,101,192

[45] Date of Patent: Mar. 31, 1992

[54] SYSTEM FOR CONTROLLING ACTIVATION OF AIR BAG FOR VEHICLE

[75] Inventor: Hideki Ishizuka, Higashimatsuyama, Japan

[73] Assignee: Diesel Kiki Co., Ltd., Tokyo, Japan

[21] Appl. No.: 541,025

[22] Filed: Jun. 20, 1990

[30] Foreign Application Priority Data

Jul. 11, 1989 [JP] Japan ................... 1-177247

[51] Int. Cl.⁵ ........................................... B60R 21/32
[52] U.S. Cl. ..................................... 340/436; 280/735
[58] Field of Search ....................... 340/436, 438, 687; 280/735, 734; 307/10.1; 180/271, 282

[56] References Cited

U.S. PATENT DOCUMENTS

| | | | |
|---|---|---|---|
| 3,622,974 | 11/1971 | Best et al. | 280/735 X |
| 3,767,002 | 10/1973 | Gillund | 280/735 |
| 3,863,208 | 1/1975 | Balban | 280/735 |
| 4,222,030 | 9/1980 | Yasui et al. | 280/735 X |
| 4,887,843 | 12/1989 | Husby | 280/735 |
| 4,938,504 | 7/1990 | Fukuda et al. | 280/735 X |
| 4,987,316 | 1/1991 | White et al. | 340/436 X |

FOREIGN PATENT DOCUMENTS 61-241231 10/1986 Japan .
63-166636 7/1988 Japan .
63-247147 10/1988 Japan .
1-164649 6/1989 Japan .

*Primary Examiner*—Jin F. Ng
*Assistant Examiner*—Brian R. Tumm

[57] ABSTRACT

A system for controlling the activation of an air bag for a vehicle includes a capacitor connected to a battery via a main electric wire. The supply of electric current from the capacitor to a squib of the air bag is controlled by a first switch. Upon collision of the vehicle, the first switch is closed to allow current to flow to the squib of the air bag. The control system further includes a malfunction alarm device which is connected to the battery via an auxiliary electric wire. The supply of current from the battery to the malfunction alarm device via the auxiliary electric wire is controlled by a second switch. When an electric current path, extending between the battery and the capacitor and including the main electric wire, is interrupted, the second switch is intermittently closed to operate the malfunction alarm device. A current control device is connected between the capacitor and one end of the auxiliary electric wire connected to the malfunction alarm device, and allows electric current to flow only from the auxiliary electric wire toward the capacitor. When said second switch is opened, the battery changes the capacitor via the auxiliary electric wire.

7 Claims, 1 Drawing Sheet

SYSTEM FOR CONTROLLING ACTIVATION OF AIR BAG FOR VEHICLE

BACKGROUND OF THE INVENTION

This invention relates to a system for controlling the activation of an air bag for use in a vehicle.

An air bag is mounted on that portion of a vehicle opposed to the passenger of the vehicle. Upon crash or collision of the vehicle, a squib of the air bag is fired or activated to produce gas in the air bag to instantaneously expand or inflate the air bag, thereby protecting the passenger.

A system for activating a squib of such an air bag, as disclosed in Japanese Laid-Open (Kokai) Patent Application No. 247147/88, includes an energy-reserving capacitor connected to a battery via a relatively long electric wire. A switch (first switching means) is connected between one terminal of the capacitor connected to the battery and the squib of the air bag. This switch has the function (first control means) for detecting deceleration of the vehicle, and upon collision of the vehicle, this switch detects an abrupt deceleration of the vehicle and is closed, so that the switch allows electric current from the battery to flow to the squib to activate the same. Even if the electric wire is broken or cut when the vehicle collision takes place, the electric charge stored up in the capacitor is supplied to the squib, thus effecting the activation of the squib without fail.

In the system of the above Japanese Laid-Open application, when the electric wire or a fuse connected to the electric wire is cut, an alarm lamp (malfunction alarm device) is lit to tell the drive of the vehicle of this fact. More specifically, this alarm lamp is connected to the terminal of the capacitor connected to the battery, and also is grounded via a transistor. The cutting of the electric wire is detected by a monitor circuit (second control means), and the transistor is turned on in response to a detection signal from the monitor circuit, thereby lighting the alarm lamp. The supply of electric current to the alarm lamp is effected by discharging the electric charge stored up in the capacitor, since because of the cutting of the electric wire, electric current can not be supplied from the power source (battery).

In the activating control system of the above Japanese Laid-Open application, when the electric wire is cut, the electric charge stored up in the capacitor is much or completely consumed after the alarm lamp is lit for a long time, which results in a problem that the squib of the air bag fails to be activated upon collision of the vehicle.

Other prior art includes Japanese Laid-Open Patent Application Nos. 241231/86, 166636/88 (corresponding to U.S. Pat. No. 4,887,843) and 164649/89. Laid-Open Application No. 241231/86 discloses a control system provided with an energy-reserving capacitor. Laid-Open Application No. 166636/88 discloses a control system in which an energy-reserving capacitor is charged by a battery via an inductance. Laid-Open Application No. 164649/89 discloses a control system provided with a microcomputer.

SUMMARY OF THE INVENTION

It is an object of this invention to provide a system which can positively activate or fire a squib of a air bag even when a malfunction alarm device is in an operative condition as a result of interruption of the connection between a capacitor and a battery.

According to the present invention, there is provided a system for controlling the activation of a squib of an air bag for a vehicle, comprising:
(a) a battery;
(b) an energy-reserving capacitor;
(c) a main electric wire connecting the capacitor to the battery;
(d) first switching means for controlling the supply of electric current from the capacitor to the squib of the air bag;
(e) first control means for detecting collision of the vehicle to close the first switching means, thereby supplying electric current to the squib of the air bag to activate the squib
(f) a malfunction alarm device;
(g) an auxiliary electric wire connecting the malfunction alarm device to the battery;
(h) second switching means for controlling the supply of electric current from the battery to the malfunction alarm device via the auxiliary electric wire;
(i) second control means for detecting interruption of an electric current path extending between the battery and the capacitor and including the main electric wire, and for intermittently closing the second switching means when the second control means detects the interruption; and
(j) current control means connected between capacitor and one end of the auxiliary electric wire connected to the malfunction alarm device, the current control means allowing the electric current to flow only from the auxiliary electric wire toward the capacitor.

DESCRIPTION OF THE PREFERRED EMBODIMENT OF THE INVENTION

Figure 1:
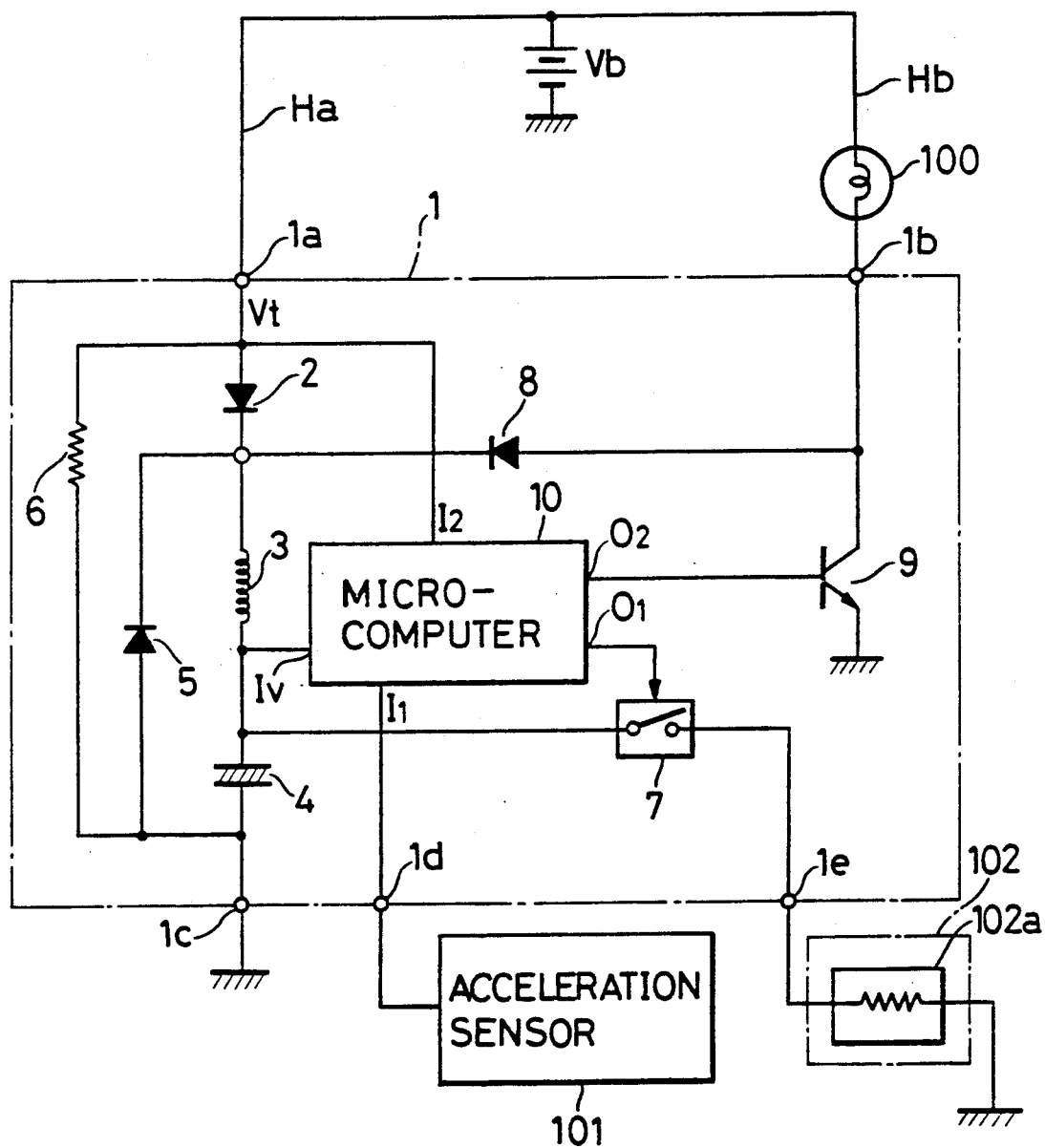
FIG. 1 is a circuit diagram of a system for controlling the activation of an air bag, provided in accordance with the present invention.

A system for controlling the activation of an air bag for a vehicle, embodying the present invention, will now be described with reference to the drawing. A main portion of this system is provided as a unit housed, for example, in a casing 1. The casing 1 has two power-connecting terminals 1a and 1b. One power-connecting terminal 1a is connected to a battery Vb via a main electric wire Ha, and the other power-connecting terminal 1b is also connected to the battery Vb via an alarm lamp 100 (malfunction alarm device) and an auxiliary electric wire Hb. The alarm lamp 100 is mounted either on or near the outer surface of the casing 1. The casing 1 and the battery Vb are spaced apart from each other, and the main electric wire Ha and the auxiliary electric wire Hb connecting the casing 1 to the battery Vb are relatively long.

The casing 1 also has a ground terminal 1c, a signal input terminal 1d, and a feeder terminal 1e. An acceleration sensor 101 is connected to the signal input terminal 1d, and a squib 102a of an air bag 102 is connected to the feeder terminal 1e.

An internal circuit structure of the casing 1 will now be described in detail. Connected in series between the power-connecting terminal 1a and the ground terminal 1c are a diode 2, an inductance 3 and an energy-reserving capacitor 4 arranged in this order from the power-connecting terminal 1a. The anode of the diode 2 is directed toward the power-connecting terminal 1a, and the cathode thereof is directed toward the inductance 3. A diode 5 for absorbing a surge voltage is connected in parallel with the serial circuit of the inductance 3 and the capacitor 4. A ground resistor 6 of a very high resistivity is connected in parallel with the serial circuit of the diode 2, the inductance 3 and the capacitor 4 between the power-connecting terminal 1a and the ground terminal 1c.

The junction point between the capacitor 4 and the inductance 3 is connected to the feeder terminal 1e via a switch 7 serving as first switching means. The switch 7 is used for controlling the supply of power to the squib 102a.

The power-connecting terminal 1b is connected to the collector of an emitter-grounded transistor 9 serving as second switching means. The transistor 9 is used for controlling the supply of power to the alarm lamp 100.

The junction point between the diode 2 and the inductance 3 is connected to the junction point between the power-connecting terminal 1b and the transistor 9 via a diode 8 serving as current control means. The anode of the diode 8 is directed toward the power-connecting terminal 1b, and the cathode thereof is directed toward the inductance 3. The diode 8 only allows the current to flow from the auxiliary electric wire Hb toward the capacitor 4, and prohibits the flow of the current in a reverse direction.

A microcomputer 10 is also mounted within the casing 1. The microcomputer 10 has a power terminal Iv, two signal input ports $I_1$ and $I_2$ and two signal output ports $O_1$ and $O_2$. The power terminal Iv is connected between the inductance 3 and the capacitor 4 to be supplied with voltage and current from the capacitor 4. The signal input port $I_1$ is connected to the signal input terminal 1d to be supplied with a signal from the acceleration sensor 101. The signal input port $I_2$ is connected to the junction point between the power-connecting terminal 1a and the anode of the diode 2 to receive a terminal voltage Vt of the power-connecting terminal 1a as a signal. The signal output port $O_1$ outputs a signal for controlling the switch 7. The signal output port $O_2$ outputs a signal for controlling the transistor 9.

The operation of the above control system, when the main electric wire Ha is not in a broken or cut condition, will first be described. In this case, since current flows from the battery Vb to the capacitor 4 via the main electric wire Ha, the diode 2 and the inductance 3, the capacitor 4 is always kept charged to the voltage level of the battery Vb. The microcomputer 10 receives the voltage and current from the battery Vb via the power terminal Iv, and is kept in an operative condition.

When the main electric wire Ha is not in a broken or cut condition, current of a small value flows through the ground resistor 6, and the voltage Vt of the power-connecting terminal 1a is equal to the battery voltage Vb. The microcomputer 10 receives this high-level voltage Vt at its signal input port $I_2$, and judges that the main electric wire Ha is not cut, and renders the output of the signal input port $O_2$ to a low level, thereby keeping the transistor 9 in the OFF state.

Also, the microcomputer 10 is responsive to the acceleration signal from the acceleration sensor 101 to judge whether or not the deceleration of the vehicle exceeds a predetermined or allowable level. When the vehicle is in a normal operating or running condition, the deceleration of the vehicle will not exceed the allowable level. Therefore, in this case, the judgment of the microcomputer 10 is "NO", so that the microcomputer 10 renders the output of the signal output port $O_1$ to a low level, thereby keeping the switch 7 in the OFF state.

Upon collision of the vehicle, the microcomputer 10 judges that the deceleration of the vehicle exceeds the allowable level, so that a control signal of a high level is outputted from the signal output port $O_1$ to the switch 7. As a result, the switch 7 is closed, so that the current is supplied from the battery Vb to the squib 102a via the main electric wire Ha, the diode 2, the inductance 3 and the switch 7. As a result, the squib 102a is fired or activated to expand or inflate the air bag instantaneously. Even when the main electric wire Ha is cut because of the impact generated at the time of the collision, the charge stored up in the capacitor 4 is discharged so as to supply current to the squib 102a, thus achieving the activation of the squib 102a.

Next, the operation of the system, when the main electric wire Ha or a fuse connected thereto is in a broken or cut condition, will now be described. When the main electric wire Ha is cut, the voltage Vt of the power-connecting terminal 1a is rendered to zero volt since the power-connecting terminal 1a is grounded via the ground resistor 6. Based on this voltage drop of the voltage Vt, the microcomputer 10 judges that the wire cutting (malfunction) takes place, and outputs a control signal to the transistor 9. This control signal goes high and low alternately in a predetermined duty ratio at a short cycle. As a result, the transistor 9 is turned on and off alternately to light the alarm lamp 100. Since the alternate ON and OFF of the transistor 9 is effected at a short cycle, the alarm lamp 100 is continuously lit.

As described above, the alarm lamp 100 is lit by the current supplied from the battery Vb via the auxiliary electric wire Hb, and the charge stored up in the capacitor 4 is not consumed for the lighting of the alarm lamp 100. Also, the diode 8 prevents the charge of the capacitor 4 from being discharged to the ground via the transistor 9 when the transistor 9 is turned on.

When the main electric wire Ha is cut, the charging of the capacitor 4 by the battery Vb via the main electric wire Ha is stopped. The capacitor 4 consumes the charge for operating the microcomputer 10, and particularly for effecting the writing onto an EEPROM which is contained in the microcomputer 10 for storing malfunction information. However, each time the transistor 9 is turned off at the short cycle, the current from the battery Vb flows to the capacitor 4 via the auxiliary electric wire Hb, the alarm lamp 100, the diode 8 and the inductance 3, and therefore the capacitor 4 is charged with an energy corresponding to the above consumed energy. Although the supplementary current supplied via the auxiliary electric wire Hb is in the form of rectangular pulses, a fluctuation of the voltage of the capacitor 4 is relieved by the inductance 3.

Even when because of the cutting of the main electric wire Ha, the alarm lamp 100 is lit to indicate this cutting, the capacitor 4 can fully perform the function of a supplementary power source since an adequate amount of charge is always stored in the capacitor 4. More specifically, upon collision of the vehicle, the charge stored up in the capacitor 4 is discharged so as to supply the current to squib 102a, thereby positively activating the squib 102a. Also, the current and voltage for operating the microcomputer 10 can be provided.

Even when the main electric wire Ha is cut soon after an ignition key (not shown) of the vehicle is turned on, the capacitor 4 can be charged via the auxiliary electric wire Hb, as described above, and the activation of the squib 102a as well as the operation of the microcomputer 10 including the writing onto the EEPROM can be ensured.

As described above, the microcomputer 10 is responsive to the signal from the acceleration sensor 101 to judge whether or not the collision of the vehicle occurs. More specifically, the microcomputer 10 is programmed to hold the switch 7 in the OFF state when the microcomputer 10 judges that no collision occurs. Also, the microcomputer 10 is programmed to turn on the switch 7 when any collision occurs. Therefore, the microcomputer 10 substantially includes a first control means for controlling the switch 7. Further, in accordance with the level of the voltage Vt of the power-connecting terminal 1a, the microcomputer 10 judges whether or not the main electric wire Ha is cut. More specifically, the microcomputer 10 is programmed to hold the transistor 9 in the OFF state when the microcomputer 10 judges that the main electric wire Ha is not cut. Also, the microcomputer 10 is programmed to turn the transistor 9 on and off alternately at the short cycle when the microcomputer 10 judges that the main electric wire Ha is cut. Therefore, the microcomputer 10 substantially includes a second control means for controlling the transistor 9.

The present invention is not to be restricted to the above embodiment, and various modifications can be made. For example, the first switching means may comprises a switch of the deceleration-sensitive type, in which case the first switching means substantially includes the first control means.

The diode, constituting the current control means for allowing the current to flow only from the auxiliary electric wire to the capacitor, may be replaced by a transistor operated by the microcomputer.

In the above embodiment, although the control signal for the second switching means is of the type to turn the second switching means on and off alternately at the short cycle to continuously light the alarm lamp, this control signal may be of such a type as to turn the second switching means on and off alternately at a relatively long cycle to flash the alarm lamp.

Further, the first control means may be of such a type as to detect not only the cutting of the electric wire but also the cutting of the squib so as to operate the malfunction alarm device.

What is claimed is:

1. A system for controlling the activation of a squib of an air bag for a vehicle, comprising:
   (a) a battery;
   (b) an energy-reserving capacitor;
   (c) a main electric wire connecting said capacitor to said battery;
   (d) first switching means for controlling the supply of electric current from said capacitor to said squib of said air bag;
   (e) first control means for detecting collision of said vehicle to close said first switching means, thereby supplying electric current to said squib of said air bag to activate said squib;
   (f) a malfunction alarm device;
   (g) an auxiliary electric wire connecting said malfunction alarm device to said battery;
   (h) second switching means for controlling the supply of electric current from said battery to said malfunction alarm device via said auxiliary electric wire;
   (i) second control means for detecting interruption of an electric current path extending between said battery and said capacitor and including said main electric wire, and for intermittently closing said second switching means when said second control means detects said interruption; and
   (j) current control means connected between said capacitor and one end of said auxiliary electric wire connected to said malfunction alarm device, said current control means allowing the electric current to flow only from said auxiliary electric wire toward said capacitor.

2. A system according to claim 1, in which said first control means and said second control means are constituted by a single microcomputer.

3. A system according to claim 2, in which said current control means includes a first diode whose anode is directed toward said malfunction alarm device whereas a cathode of said first diode is directed toward said capacitor.

4. A system according to claim 3, further comprising a second diode connected between one end of said main electric wire remote from said battery and said capacitor, an anode of said second diode being directed toward said battery whereas a cathode of said second diode is directed toward said capacitor.

5. A system according to claim 4, further comprising an inductance, one terminal of said inductance being connected to said capacitor whereas the other terminal of said inductance is connected to the cathodes of said first and second diodes.

6. A system according to claim 5, in which said microcomputer has a power terminal which is connected to a junction point between said inductance and said capacitor, so that a power voltage for said microcomputer is equal to a voltage of said junction point between said inductance and said capacitor.

7. A system according to claim 5, in which there is provided a resistor of a high resistivity connected at its one terminal to the anode of said second diode, the other terminal of said resistor being grounded, said microcomputer judging, in accordance with an anode voltage of said second diode, whether or not said interruption of said electric current path occurs.

* * * * *